July 26, 1966  S. S. WARZYNSKI ETAL  3,262,357
TRI-SYNCHRO FILM VIEWER

Filed May 22, 1963  6 Sheets-Sheet 3

INVENTORS
SIGMUND S. WARZYNSKI,
NOAL PEACOCK
BY
ATTORNEYS

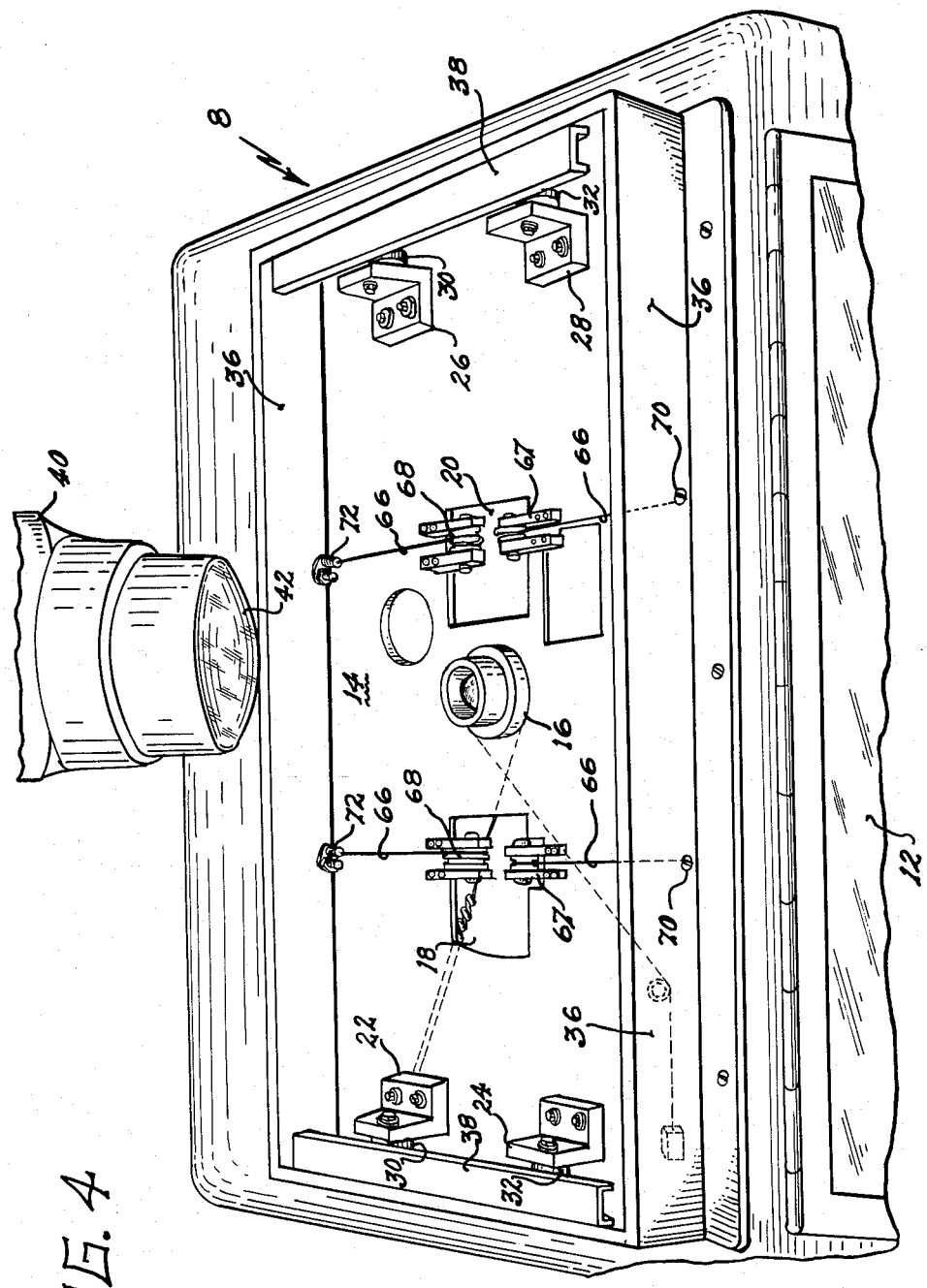

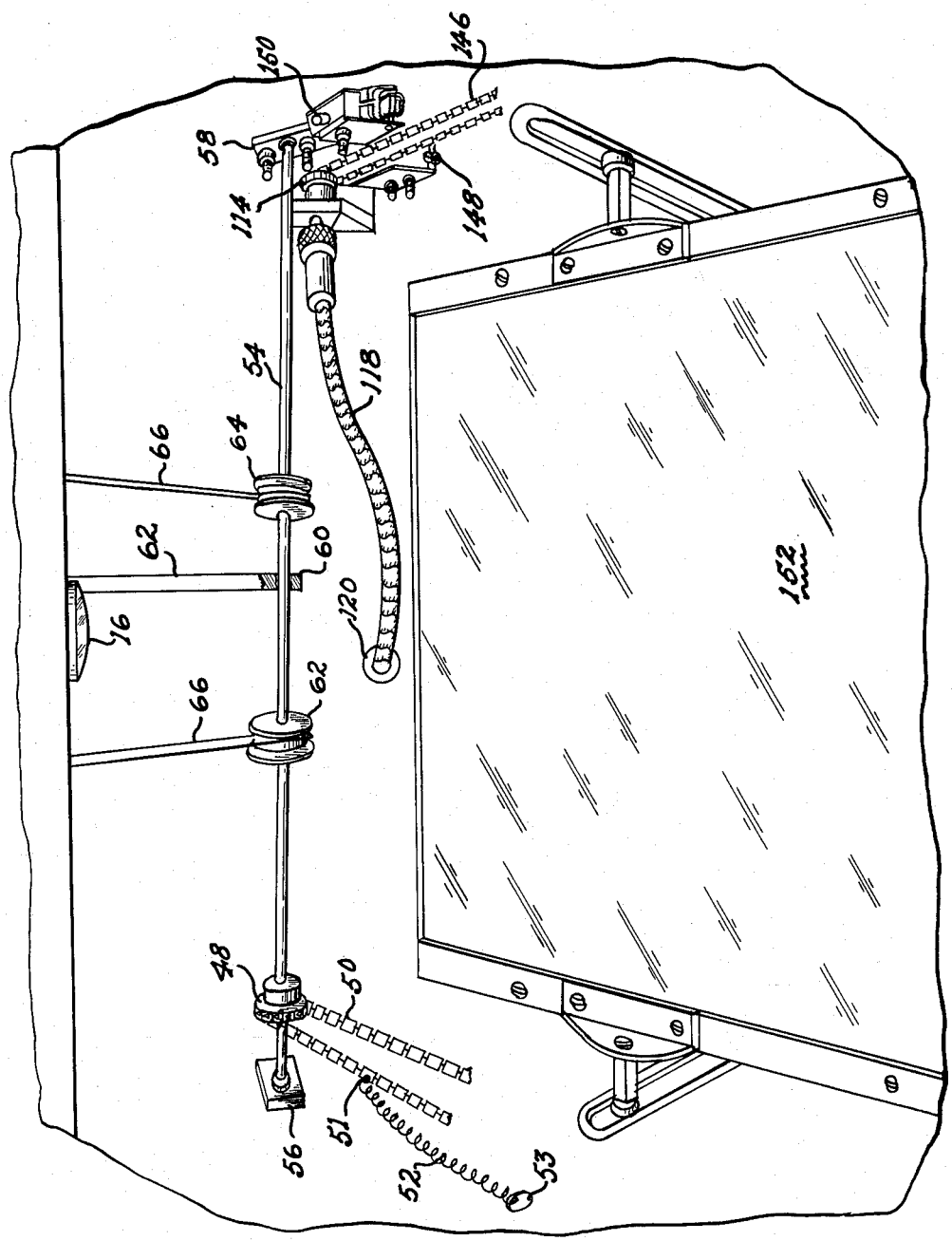

United States Patent Office 3,262,357
Patented July 26, 1966

3,262,357
TRI-SYNCHRO FILM VIEWER
Sigmund S. Warzynski, Fort Walton Beach, and Noah Peacock, Crestview, Fla., assignors to the United States of America as represented by the Secretary of the Air Force
Filed May 22, 1963, Ser. No. 282,519
6 Claims. (Cl. 88—24)

This invention relates to a tri-synchro film viewer and more particularly to a device for viewing in sequence corresponding frames of a plurality of synchronized film.

The object and purpose of the invention is the provision of a unified film viewer capable of synchronizing and viewing in sequence corresponding frames on a plurality of films, three as shown in the example.

Another object of this invention is to provide a tri-synchro film viewer which is economical to produce and utilizes conventional, currently available components that lend themselves to standard mass production manufacturing techniques.

To accomplish these purposes, a device has been constructed capable of synchronizing and projecting a plurality of rolls of film. The films are loaded onto a film head, which is itself carried on a movable platform. The films are synchronized by means of a unique feature of the invention and locked into place to be reeled off in unison. Once the film is locked in, it will stay as the operator has set it and the films will pass in unison from a feed spindle to a takeup spindle. The operation of the machine is performed by hand so that the operator is able to examine the projection on a screen of any one film frame as long as he wishes before another frame is moved into place over the projecting lens. It is conceivable of course that the operation could be made automatic, if circumstances made automatic operation desirable or expedient.

In the example presently described, when the films have been synchronized, the operator turns a control wheel on his left side of the machine, the whole film head platform is moved toward or away from the operator's position, sliding forward or rearward on the inclined top floor of the cabinet so that first one then another of corresponding frames of each of the three films are moved in sequence over the stationary projecting lens, which is built into the top floor of the cabinet. The frame is projected onto the screen, is examined, the intelligence recorded for example on an IBM machine, and the platform is moved to the corresponding frame on a second roll of film, the intelligence recorded, and so on. When the corresponding frames on all of the film rolls have been recorded, the operator turns the film-advance wheel located at the operator's right, and all films are advanced together to the next frame.

The tri-synchro film viewer was primarily designed and fabricated for use in reading photographed azimuth, elevation and range information from the dials of a radar computer. This device may be used, however, in any area of photographic evaluation where it is necessary to compare two or three synchronized rolls of film. Possible examples are: (1) use in evaluation and comparison of map photos, (2) before/after comparison of sequence photos made in structural testing, (3) for use in evaluating pre and post strike, photo reconnaissance film.

FIGURE 4 is a view of the upper wall of the cabinet, showing the platform with the film head removed;

FIGURE 5 is a view from a position inside the cabinet, showing portions of the film reel operation and the platform movement;

The device has four main parts: the film drive system, the projection system, the film head movement and the film synchronizing device. The film drive system and projection system, as unit devices unrelated to the combination of the present invention, are standard equipment.

When the term "film head" is used it will be understood to mean the assembly including the film loading spindle, the take up spindle, the support elements in which each spindle is journaled, and the synchronizing and guiding devices. The term film head platform refers to the frame on which the film head is mounted, and which is movable, on tracks or other device, transversely of the direction in which the films are reeled.

Figure 3:
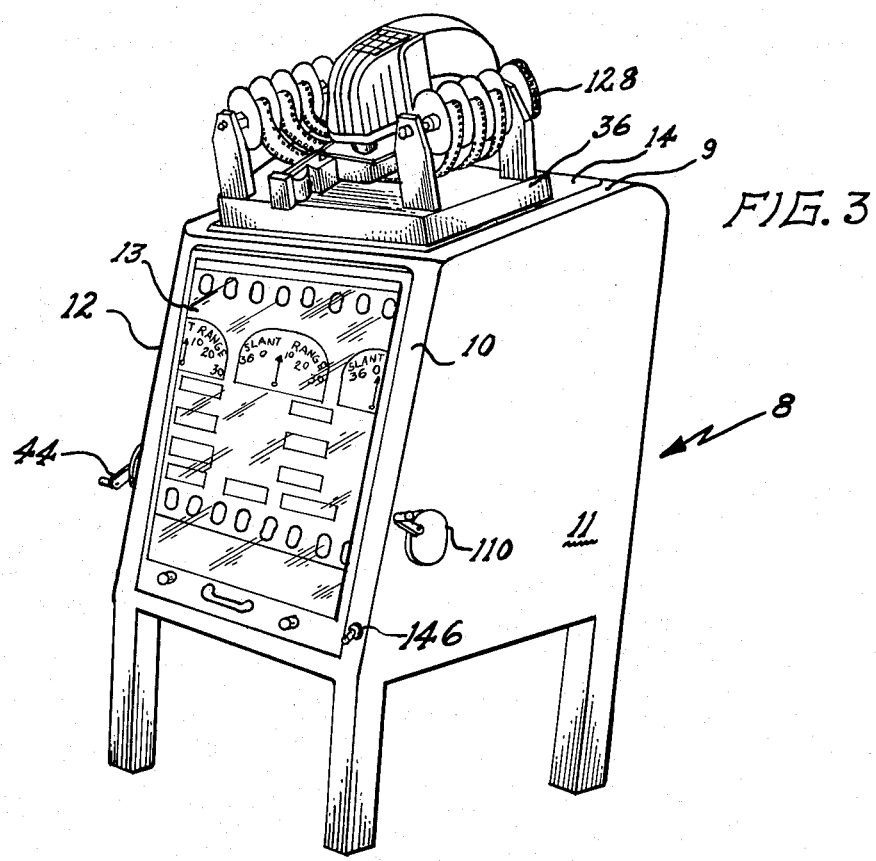
FIGURE 3 is perspective view of the movable film head platform mounted on a projection cabinet.

Referring more in detail to the drawing, note specifically FIGURE 3, a cabinet 8 has a top wall 9, front wall 10, and right and left side walls 11 and 12. A projection screen 13 is positioned on the front wall 10. This screen 13 may be tilted for convenient viewing so that an operator may control the machine from a seated position and conveniently process the data viewed on the screen on an IBM processing machine. The top wall 9 constitutes a floor plate 14 for the film reel apparatus. In the example shown, the wall 9 and plate 14 are mounted at an angle to slant downwardly toward the front 10 of the cabinet 8. A projection lens 16, FIGURE 4, is located in the approximate center of the plate 14. The plate 14 is also provided with a pair of openings 18 and 20, and brackets 22, 24, 26 and 28. These brackets provide a mounting for axles and rollers 30 and 32, two on each side of the floor 14. A frame 36, supports the whole film carrying apparatus later described.

The platform 36 is movable forwardly and rearwardly to bring each film, as selected, into projecting position between the lens 16 and the lamp 42. For this purpose a pair of inverted channel members 38 are rigidly attached to the frame 36 and provide the upper elements of a pair of tracks, which make possible the movement of the whole film head from front to rear and reverse.

The film head platform 36, which carries the film, is moved backward and forward on the tracks 38 by hand operation of control wheel 44 located on the left hand side of the cabinet 8 (see FIGURE 3). The wheel 44 operates a sprocket (not shown) located inside the cabinet. This sprocket is connected to a sprocket 48, also located inside the cabinet, by means of a chain 50 (see FIGURE 5). Since the movement of the whole heavy film head platform is involved, and its movement is on an incline, part of the weight of the film head platform structure is carried by the spring 52, secured to the chain 50 at 51, and to the cabinet interior at 53. The sprocket 48 is carried on a drive rod 54 which has journal bearings in the cabinet 10 at three points, the sides of the cabinet at 56 and 58, and the rod 62, depending from the underside of the floor 14, as illustrated in FIGURE 5. The rod 54 carries a pair of sprocket pulleys 62 and 64 mounted for rotation therewith. The cables 66, which may be, for example, 1/64 inch diameter steel, are looped around pulleys 62 and 64. Rolling or pulley cable guides 67 and 68 are located at the front and rear of openings 18 and 20 provided in the plate 14. One end of each cable passes over a roller 67 and is connected to the interior front section of the frame 36 at 70. The remaining cable ends pass over the cable guides 68 and are secured to the rear of the frame 36 at 72.

The machined tracks 38, located at the right and left, consist of the upper track 39 which is rigid with the frame 38 and movable with it, and the under track which is formed on the stationary cabinet top plate 14. The four bearings 30 and 32 are mounted on the top plate 14 by means of the L-shaped brackets 22, 24, 26 and 28, earlier referred to, and allow the forward and rearward movement of the whole film head platform, which moves on top of these bearings. The tracks have precut indentations (not shown) at specific intervals. Each track is provided with six such indentations, three for each bearing. These indentations provide accurate positioning of the film platform, so that each chosen film roll is accurately positioned over the projection lens 16.

It will now be apparent that, by rotating the control wheel 44, the pulleys 62 wind the cable 66 in either direction to move the film head platform in the direction desired. These cables move the head forward and down, or backward and up, enabling the operator to position the film head in the proper projecting positions for his examination of the film roll which he selects.

Figure 1:
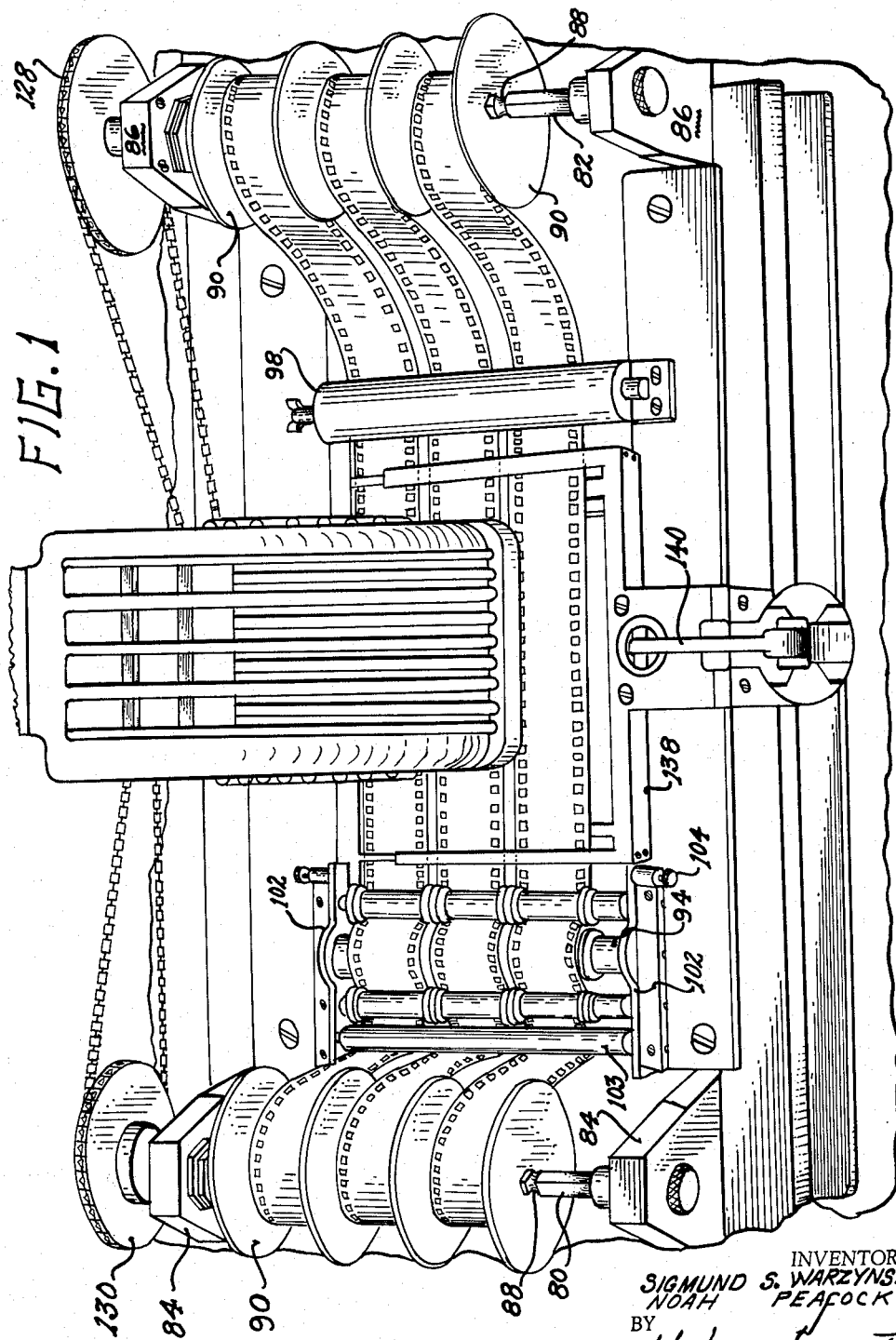
FIGURE 1 is a top view in perspective of the film head mounting showing three films installed therein.
Figure 2:
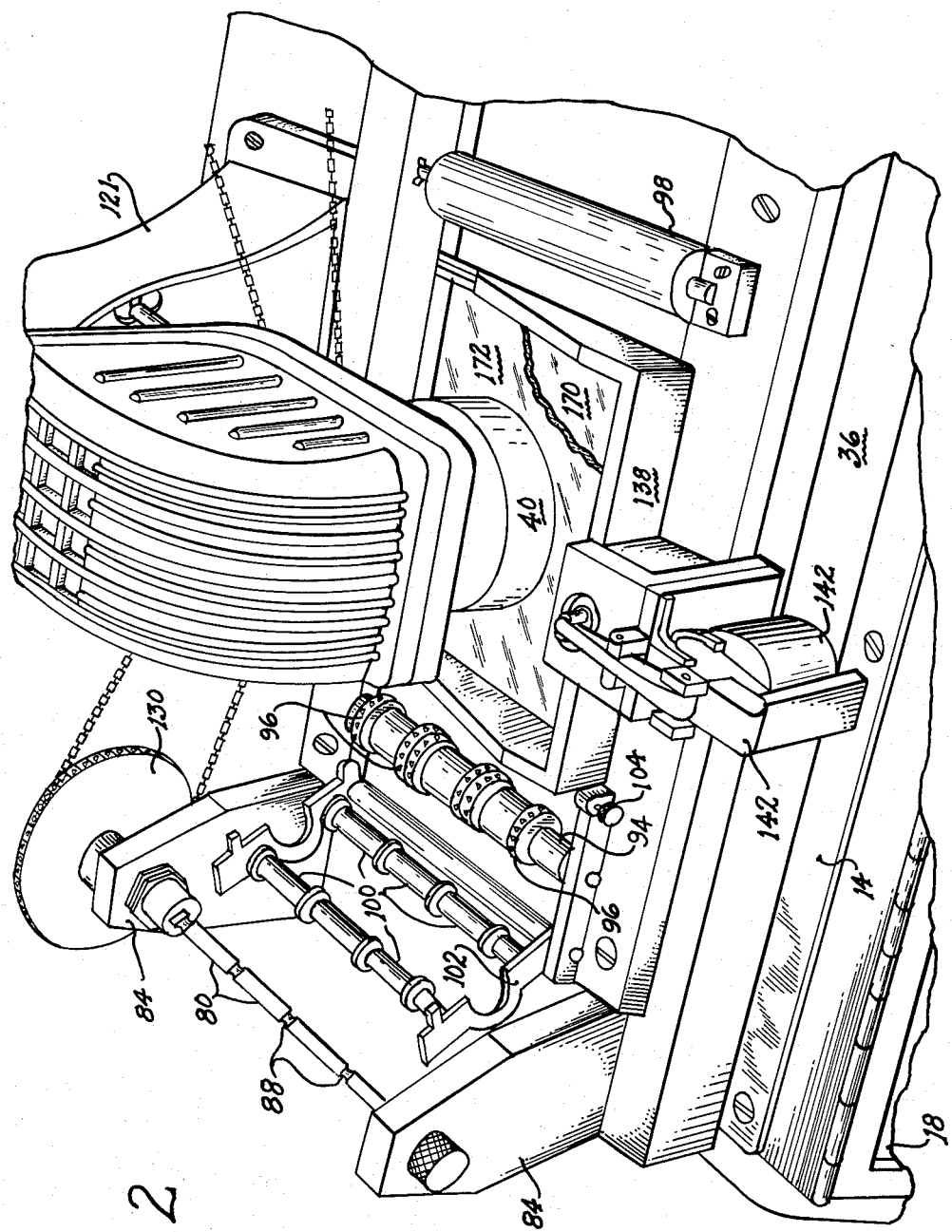
FIGURE 2 is a top view in angular perspective of the film head mounting platform, ready for the threading of film.

The film head unit is secured to and carried by the platform frame 36. The film loading and film synchronizing system is carried on this frame. Three film rolls are shown in FIGURES 1 and 3. As shown in FIGURES 1 and 2, a pair of film spool shafts 80 and 82, unique in this invention, are square or non-circular in cross section and are journaled in the shaft arms 84 and 86 on frame 36. The film spools 90 are thus keyed to these shafts. Each shaft is provided with four grooved sections 88 which are circular in cross section and are so placed that the operator is able to adjust any single roll of film for synchronizing or tightening without disturbing any of the others. This is done by moving the spool a distance approximating ¼ inch to a position where it can rotate with respect to the shaft.

The three film reels 90 with their loads of film are mounted on one of the shafts 80 or 82. The drive means later described, is so contrived that the function of shafts 80 and 82 are interchangeable as feed and takeup. The film is then passed between glass pressure plates 170, 172 (FIGURE 2), the upper one of which is secured to a movably mounted frame 138, and the film is then passed over the synchronizing sprocket spools 94 which have projections 96 for fitting in the holes provided along the sides of the films. Each spool 94 is capable of rotation independently of the others for independent movement of each spool and the film mounted thereon, as described above. When the films have been synchronized, the roller 98 is lowered into place. Six guide spools 100 are mounted, three each on a pair of shafts which are secured together by a pair of brackets 102 and, together with roller 103, form a locking frame.

Figure 6:
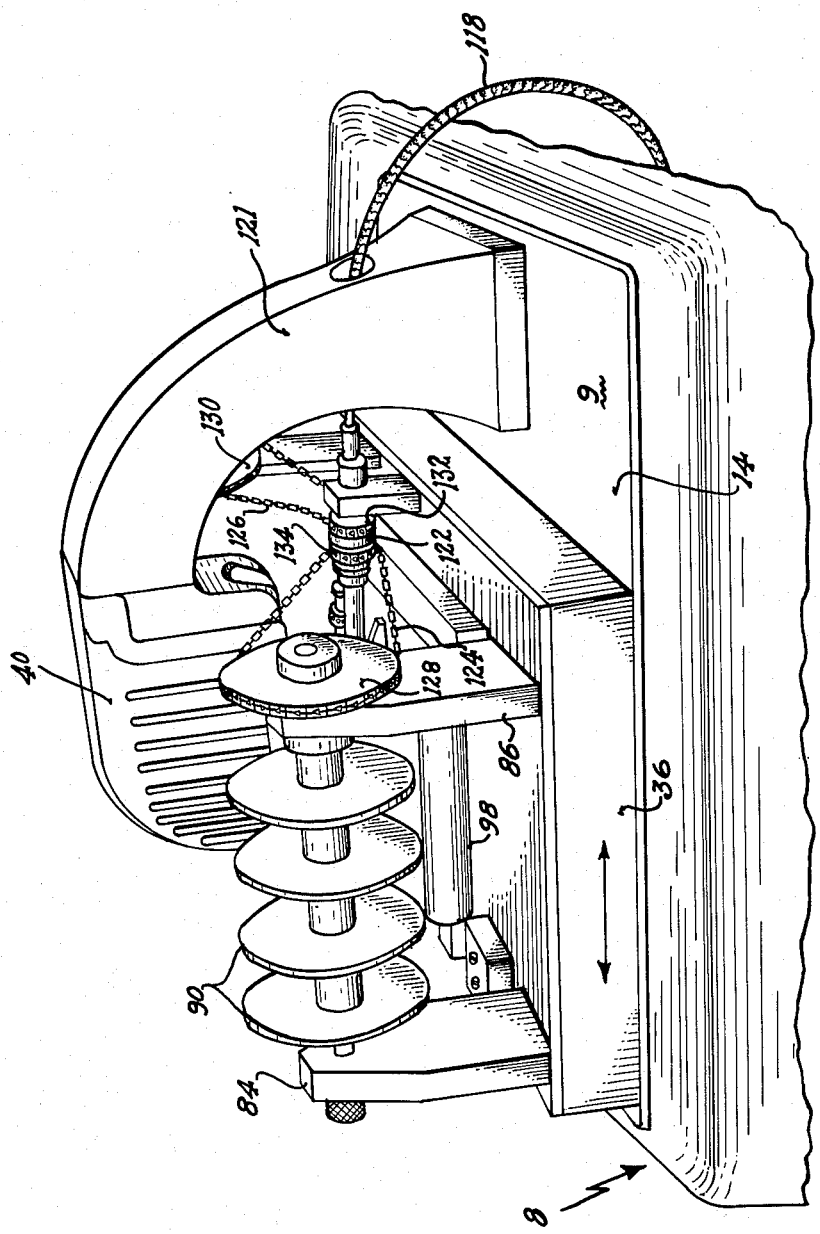
FIGURE 6 is an angular perspective rear view of the film head platform, showing the film reel operation.

The film drive system is comprised of the operator's control handle 110 located for convenient operation on the right wall of the cabinet 8, as shown in FIGURE 3. The operating wheel or handle 110 operates a sprocket (not shown) located on the interior of the wall. This sprocket operates a sprocket 114 through the medium of the chain 146, illustrated in FIGURE 5. To the sprocket 114 is connected the flexible cable 118, which is carried through the opening 120 in the rear wall of the cabinet 10, through the light housing support 121 located on top wall 9 (see FIGURE 6), and to the film head, where it operates clutch plate 122. Two chains 124 and 126 each operate one of the sprockets 128 and 130 through sprockets 132 and 134. The sprockets 132 and 134 are selectively operated by forward and reverse operation of control handle 110 such that the clutch plate 122 drives the one sprocket for forward film movement and the other for the reverse movement.

The film is held firmly in place by a pressure plate system comprising two glass plates 170 and 172, one located below the film and mounted directly on the film head platform 36. The second plate, located above the film, is mounted in a frame 138 on platform 36. The frame 138 is capable of being raised and lowered. It is raised for the release of pressure on the film to allow the operator to move the film forwardly or backwardly between the plates. The frame 138 is connected for upward and downward movement to the solenoid lever arm 140, operated by the solenoid 142 (see FIGURE 2). When the solenoid is actuated, the upper glass pressure plate 172, through lever 140 and frame 138 is tilted or raised upwardly to release pressure between upper and lower plates, so that it is possible to move the film between the glass plates without scratching or mechanical binding of the film.

The solenoid is operated by one of three switches. The first switch 146 (FIGURE 3) is located on the front of the cabinet and available to the operator for use during the loading of the film. The other two are microswitches 148 and 150 (FIGURE 5) which are automatically operated by the film drive chain 116. Thus, whenever the operator turns the drive wheel in either forward or reverse direction, the chain tension actuates one or the other of the microswitches, closing the circuit to the solenoid and moving the top pressure plate 172. Thus, the pressure on the film is automatically released whenever there is manipulation causing movement of the film. The lens 16 is capable of adjustment for focusing from the operator's position outside the cabinet by standard means (not shown) such as a cable system whereby rotation of the lens 16 causes its movement in an upward or downward direction.

Figure 7:
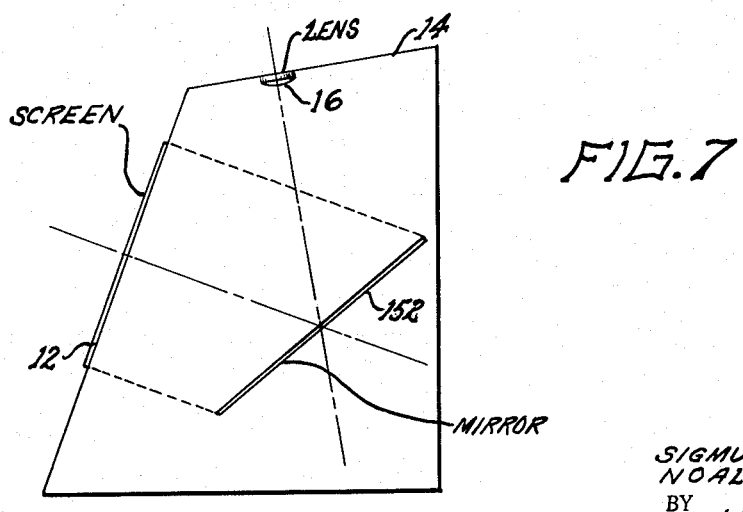
FIGURE 7 is a schematic view showing the relationship of projection lens, reflecting mirror and projection screen.

The projection system is substantially the same as that used on the Recordak Film Reader, made commercially by Eastman Kodak. A lamp 42 in the order of 200 watts is housed in lamp housing 40, which is positioned above the lamp to direct the light downwardly to the film to the lens 16. As can be seen best in FIGURE 7, the image is projected from lens 16 to a mirror 152 which then reflects the image to the screen 13, thereby providing an enlargement of the intelligence contained on the film. The mirror 152 is mounted as shown in FIGURE 5 such that it is adjustable for achieving the desired result.

Although the invention has been described with reference to a particular embodiment, it will be understood to those skilled in the art that the invention is capable of a variety of alternative embodiments within the spirit and scope of the appended claims.

We claim:

1. A film viewer for viewing in sequence on a screen corresponding frames of a plurality of synchronized film, said viewer comprising a cabinet, a top plate section, right and left walls and a front wall, a lens mounted in the medial area of said top plate section, projection means for projecting intelligence received by said lens to a screen located on said front wall, a film head platform mounted on said top plate section and movable in forward and rearward direction with reference to said top plate, means for moving said film head platform to a plurality of fixed positions, a film drive system mounted on said platform, said system comprising film reels and film guiding means for mounting a plurality of films edge to edge, means for synchronizing said film, means for moving said film head platform in a direction transverse to reeled film movement so that corresponding frames of each film are positioned in sequence over said lens and into projecting position, and means for moving said films in synchrony from one reel to another.

2. A film viewer comprising a cabinet, upper, front and side walls on said cabinet, a projection screen on the front wall of said cabinet, a projection lens mounted in the top wall of said cabinet, a film head platform mounted on the top wall of said cabinet and movable with respect thereto in forward and rearward direction, means for accomplishing said forward and rearward movement, a film head mounted on said film head platform and movable therewith, shafts for carrying a plurality of spools of film in edge to edge relationship located on said film head and means for reeling said spools in unison, whereby corresponding frames of each film are moved in sequence into projecting position past said lens.

3. In a film viewer, a device for mounting and reeling in unison a plurality of film, edge to edge past a projecting lens, including means for synchronizing said film, said device comprising a film head platform, a pair of film-spool-shafts mounted on said platform in spaced relation, each shaft capable of accommodating a plurality of film spools and each being of a non-circular configuration in cross-section for mating with film spool openings for relative rigidity of spool and shaft, each shaft being provided at spaced intervals along its length with circular grooves, so spaced that a film spool placed on said shaft may be rotated individually on said shaft independently of the other film spools mounted thereon for synchronizing and tightening purposes by moving said film spool to fit into said circular grooves.

4. A film spool spindle having a non-circular cross-section for mating with the opening of a film spool flange, said shaft being capable of accommodating a plurality of film spools along its length for unison rotation, means providing for rotation of individual spools on said shaft for synchronizing and tightening purposes, said means comprising circular grooves on said shaft so spaced as to allow the meshing of film spool flanges therein, so that an individual spool may be moved and rotated on the shaft, leaving the remaining spools undisturbed.

5. A film viewer for synchronizing and viewing in sequence, corresponding frames of a plurality of related film, said viewer comprising a cabinet, top, front, and side walls on said cabinet, a viewing screen located on said front wall, a film head mounted on said top wall, a projecting lens mounted in said top wall, a film head platform movably mounted on said top wall, a pair of spaced and parallel film spindles mounted on said platform, each of sufficient length to accommodate a plurality of film reels, means for moving each film independently of the others for synchronizing said plurality of film, means for operating said spindles to move said synchronized film from one spindle to the other in unison, and means for moving said film head platform in increments in a direction transverse to the direction of reeled film movement, said means comprising bearing wheels journaled in brackets attached to the upper surface of the top wall of said cabinet, track members secured to said platform, incremental notches in said track to provide stops for said platform for properly coordinating said lens with a chosen one of said films, means for moving said platform along said tracks.

6. A film viewer for synchronizing and viewing in sequence, corresponding frames of a plurality of related film, said viewer comprising a cabinet, top, front, and side walls on said cabinet, a viewing screen located on said front wall, a film head mounted on said top wall, a projecting lens mounted in said top wall, a film head platform movably mounted on said top wall, a pair of spaced and parallel film spindles mounted on said platform, each of sufficient length to accommodate a plurality of film reels, means for moving each film independently of the others for synchronizing said plurality of film, means for operating said spindles to move said synchronized film from one spindle to the other in unison, and means for moving said film head platform in increments in a direction transverse to the direction of reeled film movement, said film head platform comprises a front rail and a rear rail, and wherein the top wall of said cabinet is provided with at least one opening, a rolling cable guide located on the forward edge of said opening and a rolling cable guide located on the rearward edge of said opening, a cable secured to the forward rail of said cabinet, passing over said forward cable guide, a cable secured to the rearward rail of said cabinet, passing over said rearward cable guide, a cable drive rod, means for operating said cable drive rod in forward and reverse direction whereby said film head platform is moved as desired for examination of prepositioned frames of a selected film.

References Cited by the Examiner
UNITED STATES PATENTS

| | | | |
|---|---|---|---|
| 2,451,306 | 10/1948 | Sisson | 88—28 |
| 2,561,503 | 7/1951 | d'Ornellas | 352—123 |
| 3,659,267 | 11/1953 | Banle | 88—28 X |

FOREIGN PATENTS

| | | |
|---|---|---|
| 921,507 | 5/1947 | France. |
| 1,233,168 | 11/1960 | France. |
| 1,309,652 | 10/1962 | France. |

NORTON ANSHER, *Primary Examiner.*

V. A. SMITH, *Assistant Examiner.*